United States Patent
Anderson et al.

(10) Patent No.: US 12,054,132 B2
(45) Date of Patent: Aug. 6, 2024

(54) SENSOR ASSEMBLY, ACTUATION DEVICE FOR A BRAKE SYSTEM

(71) Applicant: Robert Bosch GmbH, Stuttgart (DE)

(72) Inventors: Chris Anderson, Paris (FR); Matthias Maidel, Buchenberg (DE); Silas Dehlwes, Leonberg (DE); Martin Winkler, Sonthofen (DE); Klaus Lerchenmueller, Rettenberg (DE); Martin Benda, Erlenbach (DE)

(73) Assignee: Robert Bosch GmbH, Stuttgart (DE)

( * ) Notice: Subject to any disclaimer, the term of this patent is extended or adjusted under 35 U.S.C. 154(b) by 204 days.

(21) Appl. No.: 17/795,864

(22) PCT Filed: Dec. 22, 2020

(86) PCT No.: PCT/EP2020/087611
§ 371 (c)(1),
(2) Date: Jul. 27, 2022

(87) PCT Pub. No.: WO2021/151596
PCT Pub. Date: Aug. 5, 2021

(65) Prior Publication Data
US 2023/0063474 A1    Mar. 2, 2023

(30) Foreign Application Priority Data
Jan. 30, 2020  (DE) .................... 10 2020 201 134.6

(51) Int. Cl.
*B60T 7/04*  (2006.01)
(52) U.S. Cl.
CPC ........... *B60T 7/042* (2013.01); *B60T 2220/04* (2013.01); *B60Y 2410/10* (2013.01)
(58) Field of Classification Search
CPC ............................ B60T 7/042; B60T 2204/04
See application file for complete search history.

(56) References Cited

U.S. PATENT DOCUMENTS 10,724,916 B2 *   7/2020   Harz .................... G01L 19/147
2011/0023265 A1 * 2/2011   Singbartl ................ B60T 8/329
                                                              16/2.1

(Continued)

FOREIGN PATENT DOCUMENTS

DE    10 2010 006 058 A1    8/2010
DE    10 2012 012 384 A1    12/2013

(Continued)

OTHER PUBLICATIONS

International Search Report corresponding to PCT Application No. PCT/EP2020/087611, mailed May 26, 2021 (German and English language document) (7 pages).

*Primary Examiner* — Long T Tran
(74) *Attorney, Agent, or Firm* — Maginot, Moore & Beck LLP

(57) ABSTRACT

The disclosure relates to a sensor assembly, having a housing, which has a cylindrical depression with a lateral wall which is closed in the circumferential direction of the depression, and having a cover which is assigned to the depression and bears at least one sensor unit, the cover having a cylindrical insertion portion which is partially inserted axially into the depression so that it is radially opposite the lateral wall at least in some regions, and the insertion portion being held axially in the depression by means of an interlocking connection. According to the disclosure, the interlocking connection has an elastically deformable C-ring, which is arranged coaxially with the insertion portion and is held axially between a first axial stop of the insertion portion on one side and a second axial stop of the lateral wall on the other side.

10 Claims, 2 Drawing Sheets

(56) References Cited

U.S. PATENT DOCUMENTS

| | | | | |
|---|---|---|---|---|
| 2011/0242941 A1* | 10/2011 | Tsuzuki | ............... | G01S 7/521 |
| | | | | 248/27.3 |
| 2013/0272637 A1* | 10/2013 | Schaefer | ............... | G01P 1/026 |
| | | | | 384/448 |
| 2016/0327109 A1* | 11/2016 | Staahl | ............... | F16D 66/026 |
| 2017/0343395 A1* | 11/2017 | Woernle | ............... | G01D 11/245 |
| 2019/0293674 A1* | 9/2019 | Chino | ............... | H05K 1/111 |

FOREIGN PATENT DOCUMENTS

| | | |
|---|---|---|
| DE | 10 2014 010 815 A1 | 1/2016 |
| DE | 10 2015 215 963 A1 | 2/2017 |
| EP | 2 447 546 A2 | 5/2012 |
| EP | 2 979 073 B1 | 8/2018 |
| JP | 2017-521310 A | 8/2017 |
| WO | 2010/091658 A1 | 8/2010 |
| WO | 2013/189567 A2 | 12/2013 |

\* cited by examiner

SENSOR ASSEMBLY, ACTUATION DEVICE FOR A BRAKE SYSTEM

This application is a 35 U.S.C. § 371 National Stage Application of PCT/EP2020/087611, filed on Dec. 22, 2020, which claims the benefit of priority to Serial No. DE 10 2020 201 134.6, filed on Jan. 30, 2020 in Germany, the disclosures of which are incorporated herein by reference in their entirety.

The disclosure relates to a sensor assembly, with a housing which has a cylindrical depression with a shell wall which is closed in the circumferential direction of the depression, and with a cover which is associated with the depression and carries at least one sensor unit, wherein the cover has a cylindrical plug-in section which is plugged in some regions axially into the depression such that it is situated radially opposite the shell wall at least in some regions, and wherein the plug-in section is held axially in the depression by a positive connection.

The disclosure moreover relates to an actuating device for a brake system, with such a sensor assembly.

BACKGROUND

Sensor assemblies of the type mentioned at the beginning are known. For example, the document EP 2 979 073 B1 discloses a sensor assembly with a housing which has a cylindrical depression with a shell wall which is closed in the circumferential direction of the depression. The sensor assembly moreover has a cover which is associated with the depression and which carries a sensor unit. The cover has a cylindrical plug-in section which is plugged in some regions axially into the depression such that it is situated radially opposite the shell wall of the depression at least in some regions.

In order to fasten the cover on the housing, the plug-in section is held axially in the depression by a positive connection. In the document EP 2 979 073 B1, the positive connection has a plurality of screws.

Alternatively, the positive connection has a securing ring which covers the cover.

SUMMARY

The sensor assembly according to the disclosure is characterized in that the positive connection has an elastically deformable C-ring which is arranged coaxially with the plug-in section and is held axially, on the one hand, between a first axial stop of the plug-in section and, on the other hand, a second axial stop of the shell wall. The terms "radial/radially" and "axial/axially" relate, within the scope of the disclosure, to a longitudinal center axis of the cylindrical plug-in section unless another reference for the terms "radial/radially" and "axial/axially" is explicitly stated. The first axial stop is preferably situated upstream from the second axial stop in the plug-in direction of the plug-in section. If the plug-in section is plugged into the depression, the first axial stop is thus situated closer to a base of the depression than the second axial stop. The C-ring then opposes removal of the plug-in section counter to the plug-in direction. Because the C-ring is held axially between the first axial stop and the second axial stop, the C-ring is arranged in a region in which the plug-in section is situated radially opposite the shell wall. The C-ring is thus not readily accessible. In particular, it is not possible to dismount the cover from the housing without visibly manipulating elements of the sensor assembly. The C-ring is preferably formed from a stainless steel material. By virtue of such a design, the C-ring is at least slightly elastically deformable and in addition has sufficient mechanical strength to prevent removal of the plug-in section from the depression counter to the plug-in direction. Moreover, a vibration-resistant positive connection is effected by the C-ring. The positive connection is thus not affected by vibration of the cover and/or the housing. The sensor unit is preferably arranged on the cover in such a way that the sensor unit is situated upstream from a free end of the plug-in section in the plug-in direction. If the plug-in section is plugged into the depression, the sensor unit is then situated axially between the free end of the plug-in section, on the one hand, and the base of the depression, on the other hand. The sensor unit is then not accessible without prior dismounting of the cover and hence protected from manipulation. The sensor unit is preferably associated with an element arranged in the housing and/or mounted in the housing and is designed to monitor this element.

According to a preferred embodiment, it is provided that the first axial stop has an annular first stop face which extends in the circumferential direction of the plug-in section, and/or that the second axial stop has an annular second stop face which extends in the circumferential direction of the depression. By virtue of such a design of the first or the second stop face, flat bearing contact over the whole circumference between the first stop face and the C-ring, or the second stop face and the C-ring, is achieved. The C-ring then particularly reliably opposes removal of the plug-in section counter to the plug-in direction.

The first stop face and/or the second stop face are preferably inclined. As a result, it is obtained that, when the C-ring is acted upon by a force which acts counter to the plug-in direction, the C-ring deforms elastically in such a way that a spacing between a first end of the C-ring and a second end of the C-ring increases. When acted upon by the force acting counter to the plug-in direction, the C-ring is thus spread such that the C-ring particularly reliably opposes removal of the plug-in section counter to the plug-in direction. For this purpose, the first stop face is preferably inclined in such a way that a radially outer edge of the first stop face is situated upstream from a radially inner edge of the first stop face in the plug-in direction. A suitable inclination of the first and/or the second stop face is preferably selected depending on a friction coefficient between the C-ring and the stop faces and on a self-locking criterion. The cover and/or the housing are preferably produced from a plastic material. The C-ring preferably compensates a temperature-induced relaxation and/or a force-induced relaxation of the cover and/or the housing.

According to a preferred embodiment, it is provided that the first stop face is a side wall of a circumferential groove of the plug-in section, and/or that the second stop face is a side wall of a circumferential groove of the shell wall. The C-ring then engages radially both into the circumferential groove of the plug-in section and into the circumferential groove of the shell wall. If the first stop is the side wall of the face circumferential groove of the plug-in section, simple plugging of the plug-in section into the depression and hence simple mounting of the sensor assembly are possible. In order to mount the sensor assembly, the C-ring is then preferably first arranged in the circumferential groove of the plug-in section. For this purpose, the C-ring may first be heated in order to widen the C-ring. If the C-ring is arranged in the circumferential groove of the plug-in section, the plug-in section is plugged into the depression. The other side wall of the circumferential groove of the plug-in section, i.e. the side wall which does not form the first stop face, then forms a carrier face by means of which the C-ring is shifted with the plug-in section until the C-ring, as soon as the plug-in section is plugged far enough into the depression, latches radially into the circumferential groove of the shell wall. An edge of the shell wall preferably has a beveled insertion edge in order to facilitate the plugging in of the plug-in section.

The C-ring is preferably held so that it is axially pretensioned between the first axial stop and the second axial stop. Axial play-free mounting of the cover and hence the sensor unit carried by the cover results therefrom. The sensor generally electrically calibrated before it is put into operation. Because the sensor unit is mounted axially with no play, the accuracy of the monitoring which the sensor unit undertakes during normal operation is increased. If the sensor unit were not to be held axially with no play, movements of the sensor unit in axial directions, i.e. in the plug-in direction or counter to the plug-in direction, could affect the accuracy of the monitoring. The plug-in section preferably has a first end face facing the base, wherein the depression has a second end face which is situated axially opposite the first end face, wherein the first end face bears axially indirectly or directly against the second end face, and wherein, by virtue of the bearing contact, a maximum plug-in depth of the plug-in section is predetermined and the C-ring is axially pretensioned.

The plug-in section and hence the sensor are preferably held in the depression radially with no play. Movements of the plug-in section in radial directions are accordingly prevented. For this purpose, the plug-in section is preferably formed so that it complements the depression. The plug-in section is preferably held in the depression radially with no play by virtue of the C-ring bearing against the inclined stop faces. If the sensor unit has no play radially, the accuracy of the monitoring which the sensor unit undertakes during normal operation is increased. If the sensor unit were not to be held radially with no play, movements of the sensor unit in radial directions could affect the accuracy of the monitoring.

The assembly preferably has a sealing ring which radially surrounds the plug-in section. The plug-in section is held in the depression in radial sealing fashion by the sealing ring. Penetration of dirt into the region in which the sensor unit is arranged is consequently prevented. The sealing ring preferably has an elastically deformable polymer material. The sealing ring is particularly preferably designed as an O-ring which is arranged concentrically with the plug-in section. The sealing ring is preferably arranged axially between the first and the second end face. The first end face then bears axially against the end face by means of the sealing ring. Alternatively, the sealing ring is preferably arranged in a further circumferential groove of the plug-in section. In this case, the first end face preferably bears immediately, i.e. directly, axially against the second end face.

The plug-in section preferably has at least one axial perforation through which an electrically conductive contact pin extends in order to electrically contact the sensor unit and to fasten the sensor unit to the cover. The cover thus carries the sensor unit by means of the contact pin. A plurality of contact pins arranged radially spaced apart from one another are preferably provided. The contact pins preferably have at least essentially the same coefficients of expansion. If the contact pins change their length because of changes in temperature, the sensor unit is shifted slightly in translation. Tilting of the sensor unit, which would influence the accuracy of the monitoring undertaken by the sensor unit particularly disadvantageously, is prevented.

The assembly preferably has an anti-rotation means which acts between the cover and the housing. Rotation of the housing and hence the sensor unit about the longitudinal center axis of the plug-in section is prevented by the anti-rotation means. The accuracy of the monitoring which the sensor unit undertakes during normal operation is also increased hereby.

According to a preferred embodiment, it is provided that the cover has, radially outside the C-ring, an axial projection which engages axially in a projection socket of the housing in order to form the anti-rotation means. By virtue of such a design of the anti-rotation means, fault-free plugging of the plug-in section into the depression is prevented. If the plug-in section were to be rotated, for example, about its longitudinal center axis in such a way that, when the plug-in section is plugged into the depression, the axial projection is not inserted into the projection socket, the axial projection would oppose the plugging of the plug-in section into the depression.

The actuating device according to the disclosure for a brake system has an input rod which is mounted so that it is axially displaceable in a housing of the actuating device and has an end which can be coupled to a brake pedal, and is characterized with the features of claim 10 by the sensor assembly according to the disclosure, wherein the housing of the actuating device forms the housing of the sensor assembly, and wherein the sensor unit is designed to monitor a displaced position of the input rod. The already mentioned advantages also result therefrom. Further preferred features and combinations of features result from the above description and from the claims.

BRIEF DESCRIPTION OF THE DRAWINGS

The disclosure is explained in detail below with the aid of the drawings, in which.

DETAILED DESCRIPTION

Figure 1:
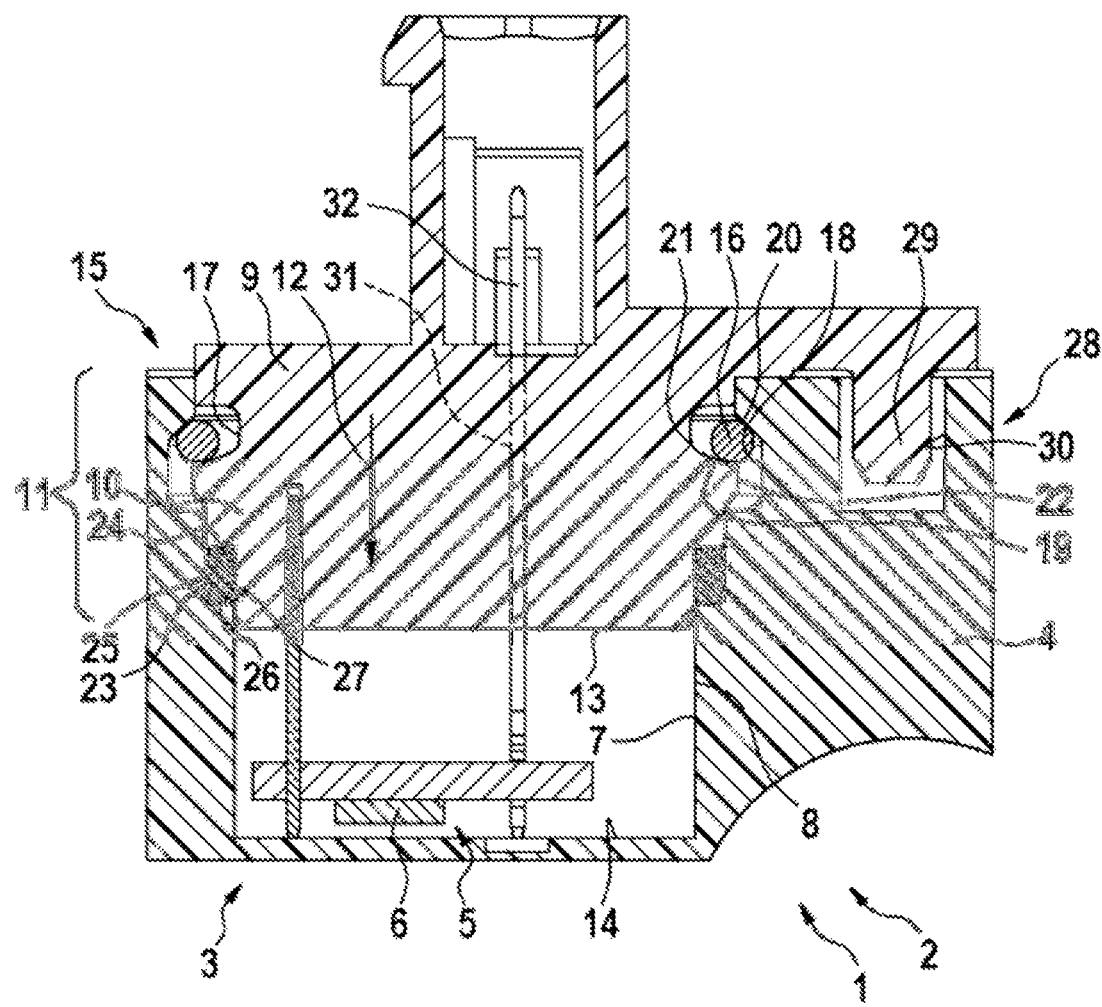
FIG. 1 shows a view in section of an actuating device of a brake system in the region of a sensor assembly.

FIG. 1 shows a view in section of an actuating device 1 of a brake system 2 in the region of a sensor assembly 3. The actuating device 1 has a housing 4 in which an input rod (not illustrated) is mounted so that it can be displaced axially with respect to its longitudinal center axis. One end of the input rod is/can be coupled to a brake pedal such that the input rod can be displaced axially by means of the brake pedal. The sensor assembly 3 has a sensor unit 5 which is associated with the input rod and is designed to detect a displaced position of the input rod. In order to detect the displaced position, the sensor unit 5 has, for example, an element 6 which is sensitive to a magnetic field. The actuating device 1 is designed to actuate a main brake cylinder of the brake system, depending on the detected displaced position of the input rod by means of an electric motor of the actuating device 1, in order to generate or amplify a deceleration torque.

The housing 4 has a depression 7 with a shell wall 8, which is closed in the circumferential direction of the depression 7, and a base 14. In the present case, the depression 7 has a circular cross-section.

The sensor assembly 3 moreover has a cover 9 associated with the depression 7. The cover 9 has a cylindrical plug-in section 10 which is plugged axially into the depression 7 in some regions such that the plug-in section 10 is situated radially opposite the shell wall 8 in a region 11. If the plug-in section 10 is plugged into the depression 7, the depression 7 is closed or covered by the plug-in section 10 or the cover 9.

The sensor unit 5 is fastened to the cover 9 such the cover 9 carries the sensor unit 5. The sensor unit 5 is thus arranged upstream from the plug-in section 10 in the plug-in direction 12 of the plug-in section 10. The sensor unit 5 is thus situated in an intermediate space between a front end 13 of the plug-in section 10 and a base 14 of the depression 7. As a result, the sensor unit 5 is situated in proximity to the input rod (not illustrated).

The plug-in section 10 is held axially in the depression 7 by a positive connection 15. The positive connection 15 has an elastically deformable C-ring 16 which is arranged coaxially with the plug-in section 10. The C-ring 16 is manufactured from stainless steel material in the present case. Alternatively, the C-ring 16 is preferably manufactured from a different material which is similar to stainless s steel material in terms of its elastic deformability.

The plug-in section 10 has a circumferential groove 17, i.e. a groove which extends through the plug-in section 10 over the whole circumference in the circumferential direction of the plug-in section 10. This circumferential groove 17 is referred to below as the first circumferential groove 17. The shell wall 8 has a circumferential groove 18, i.e. a groove which extends through the shell wall 8 over the whole circumference in the circumferential direction of the shell wall 8. This groove is referred to below as the second circumferential groove 18.

The C-ring 16 bears axially against a first axial stop which is formed by a side wall 19, which is at the front in the plug-in direction 12, of the first circumferential groove 17. The front side wall 19 is therefore a first stop face 19. The first axial stop faces away from the base 14. Moreover, the C-ring 16 bears axially against a second axial stop which is formed by that side wall 20 of the second circumferential groove 18 which is further away from the base 14. The side wall 20 is therefore a second stop face 20.

The side wall 19 of the first circumferential groove 17 is inclined in such a way that a radially inner edge 21 of the side wall 19 is spaced further away from the base 14 than a radially outer edge 22 of the side wall 19. The radially outer edge 22 is thus situated upstream from the radially inner edge 21 in the plug-in direction 12. If the plug-in section 10 is acted upon by a force acting counter to the plug-in direction 12, the inclination of the side wall 19 causes the C-ring 16 to be spread. A first end 33 of the C-ring 16 is thus moved away from a second end 34 of the C-ring 16. As a result, the C-ring 16 blocks removal of the plug-in section 10 from the depression 7. The side wall 20 of the second circumferential groove 18 is also inclined. The plug-in section 10 is arranged radially with no play in the depression 7 by virtue of the bearing contact of the C-ring 16 against the inclined side walls 19, 20.

The sensor assembly 5 moreover has an elastically deformable sealing ring 23 which is designed as an O-ring 23. The O-ring 23 is manufactured from a polymer material. The plug-in section 10 is arranged in the depression 7 in radial sealing fashion by virtue of the O-ring 23. The plug-in section 10 has a stop shoulder 24 with a first end face 25 facing the base 14. The depression 7 has a stop shoulder 26 with a second end face 27 which is situated axially opposite the first end face 25. If the plug-in section 10 is plugged into the depression 7, the O-ring 23 is arranged axially between the first end face 25 and the second end face 27.

The sensor assembly 3 moreover has an anti-rotation means 28. The anti-rotation means 28 is formed by an axial projection 29 of the cover 9 which is situated radially outside the C-ring 16 and by a projection socket 30 of the housing 4. If, as illustrated in FIG. 1, the cover 9 is mounted on the housing 4, the axial projection 29 engages axially in the projection socket 30 in order to form the anti-rotation means 28.

The plug-in section 10 has a plurality of axial perforations 31, only one of which is indicated in FIG. 1. Electrically conductive contact pins 32, which extend through the axial perforations 31 and are connected electrically to the sensor unit 5, for example to a printed circuit board of the sensor unit 5, are provided for the purpose of electrically contacting the sensor unit 5. The sensor unit 5 is moreover fastened to the cover 9 by the contact pins 32.

Figure 2:
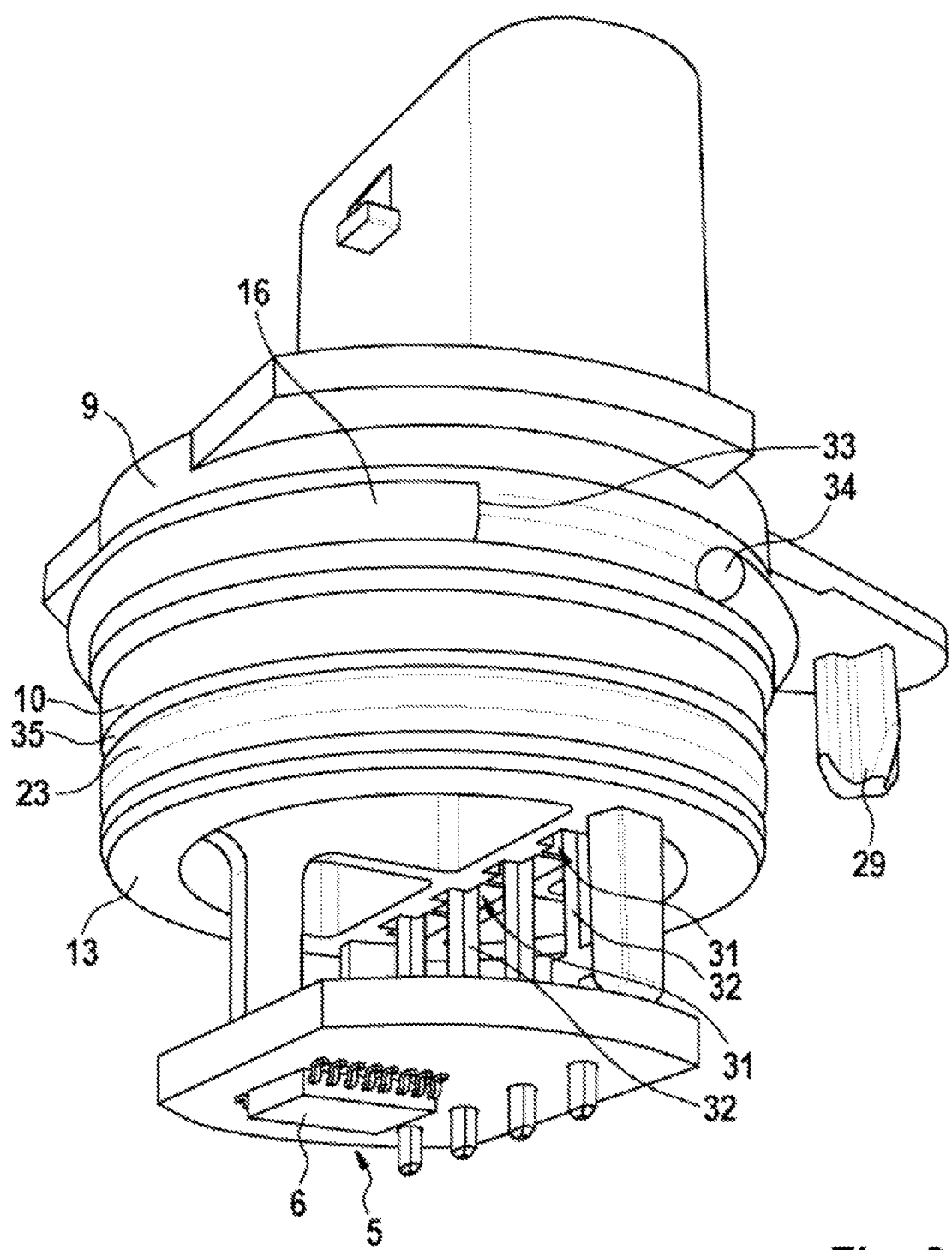
FIG. 2 shows a perspective view of a cover of the sensor assembly.

FIG. 2 shows a further exemplary embodiment of the cover 9 in a perspective view. As can be seen in FIG. 2, the C-ring 16 extends over an angle of approximately 300° about the longitudinal center axis of the plug-in section 10. This structural design is preferably also implemented with regard to the cover 9 illustrated in FIG. 1.

The plurality of axial perforations 31 and the plurality of electrically conductive contact pins 32 can moreover be seen in FIG. 2. In the present case, the sensor assembly 3 has four axial perforations 31 and four contact pins 32. A cross-section of the axial perforations 31 is at least slightly larger than a cross-section of the contact pins 32 such that the contact pins 32 have an amount of radial play in the axial perforations 31.

The cover 9 illustrated in FIG. 2 differs in particular from the cover 9 illustrated in FIG. 1 in that the sealing ring 23 is arranged in a further circumferential groove of the plug-in section 10, i.e. a third circumferential groove 35. If the cover 9 illustrated in FIG. 2 is fastened to the housing 4 by plugging in the plug-in section 10, the front end 13 of the plug-in section 10 bears as a first end face axially directly against the second end face 27 of the housing 4. The maximum plug-in depth of the plug-in section 10 is predetermined and the C-ring axially pretensioned by virtue of the bearing contact of the front end 13 against the second end face 27.

The invention claimed is:

1. A sensor assembly, comprising:
a housing defining a cylindrical depression and including a shell wall which is closed in the circumferential direction of the depression; and
a cover and which carries at least one sensor unit,
wherein the cover has a cylindrical plug-in section which is configured to be plugged in some regions axially into the depression such that it is situated radially opposite the shell wall at least in some regions,
wherein the plug-in section is configured to be held axially in the depression by a positive connection, and
wherein the positive connection has an elastically deformable C-ring which is arranged coaxially with the plug-in section and is held axially between a first axial stop of the plug-in section and a second axial stop of the shell wall.

2. The sensor assembly as claimed in claim 1, wherein:
the first axial stop has an annular first stop face which extends in the circumferential direction of the plug-in section, and/or the second axial stop has an annular second stop face which extends in the circumferential direction of the depression.

3. The sensor assembly as claimed in claim 2, wherein the first stop face and/or the second stop face are inclined.

4. The sensor assembly as claimed in claim 2, wherein the first stop face is a side wall of a circumferential groove of the plug-in section and/or the second stop face is a side wall of a circumferential groove of the shell wall.

5. The sensor assembly as claimed in claim 1, wherein the C-ring is held so that it is axially pretensioned between the first axial stop and the second axial stop.

6. The sensor assembly as claimed in claim 5, further comprising a sealing ring which radially surrounds the plug-in section.

7. The sensor assembly as claimed in claim 1, wherein the plug-in section has at least one axial perforation through which an electrically conductive contact pin extends in order to electrically contact the sensor unit and fasten the sensor unit to the cover.

8. The sensor assembly as claimed in claim 1, further comprising an anti-rotation mechanism acting between the cover and the housing.

9. The sensor assembly as claimed in claim 8, wherein the cover has, radially outside the C-ring, an axial projection which engages axially in a projection socket of the housing in order to form the anti-rotation mechanism.

10. An actuating device for a brake system, comprising:
an actuator device housing;
an input rod which is mounted so that it is axially displaceable in the actuator device housing, the input rod having an end which is configured to be coupled to a brake pedal; and
a sensor assembly as claimed in claim 1,
wherein the actuating device housing forms the housing of the sensor assembly, and
wherein the sensor unit is designed to monitor a displaced position of the input rod.

* * * * *

UNITED STATES PATENT AND TRADEMARK OFFICE
CERTIFICATE OF CORRECTION

PATENT NO. : 12,054,132 B2  
APPLICATION NO. : 17/795864  
DATED : August 6, 2024  
INVENTOR(S) : Anderson et al.

Page 1 of 1

It is certified that error appears in the above-identified patent and that said Letters Patent is hereby corrected as shown below:

In the Claims

In Claim 1, at Column 6, Line 52: "cover and which carries" should read --cover which carries--.

Signed and Sealed this  
Eighteenth Day of March, 2025

Coke Morgan Stewart  
*Acting Director of the United States Patent and Trademark Office*